United States Patent Office 3,507,543
Patented Apr. 21, 1970

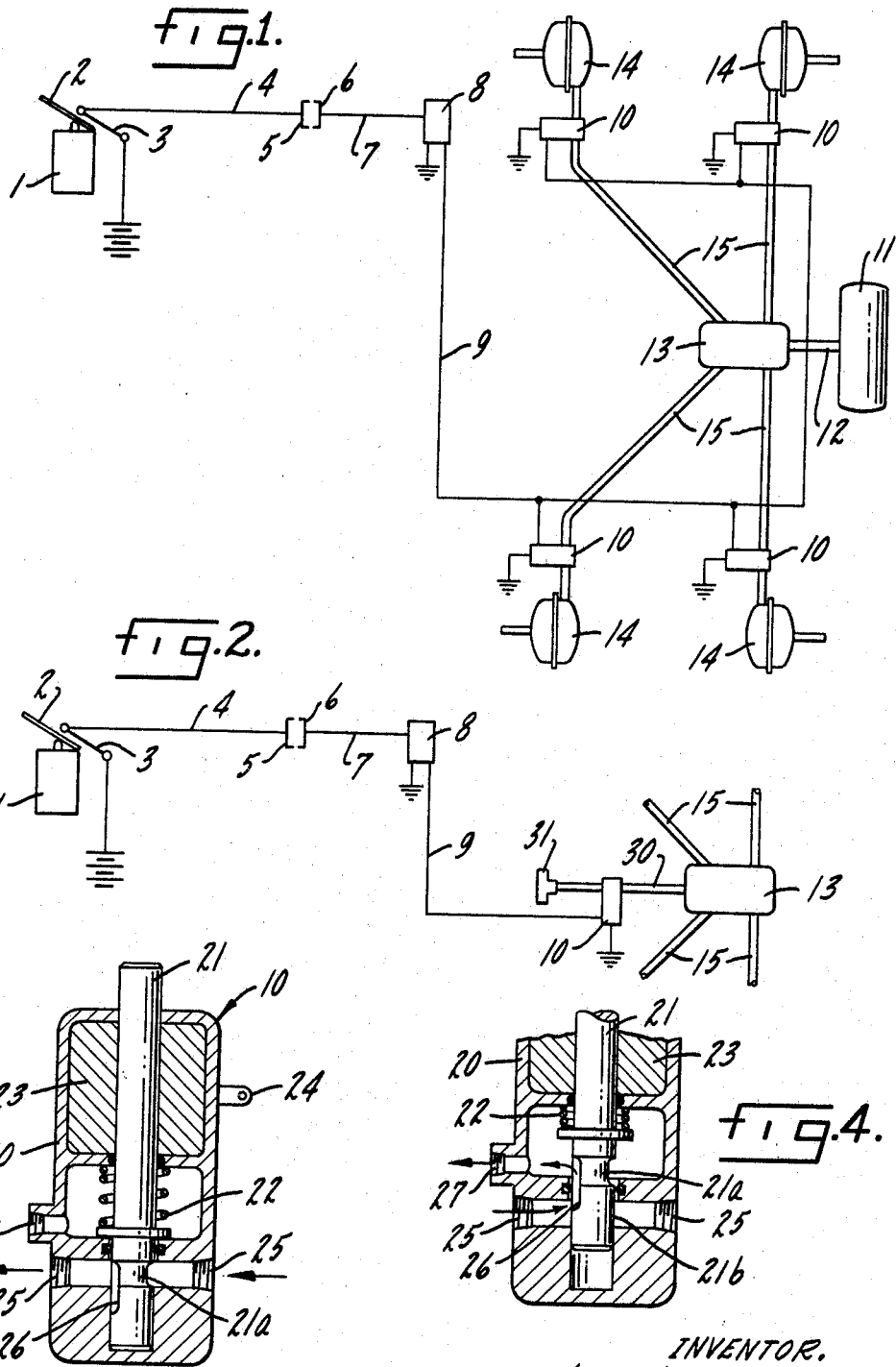

3,507,543
TRAILER BRAKE RELEASE SYSTEM
Joseph L. Cannella, Melrose Park, Ill., assignor to Berg Mfg. & Sales Co., Des Plaines, Ill., a corporation of Illinois
Filed Nov. 5, 1968, Ser. No. 773,400
Int. Cl. B60t *13/68*
U.S. Cl. 303—7                              7 Claims

ABSTRACT OF THE DISCLOSURE

A brake release system for the trailer brakes of a trailer-tractor vehicle combination. A switch responsive to release of the tractor foot pedal closes to send a signal through a time-delay device to electrically-operated valve means. Actuation of the valve means exhausts the trailer brake chambers. The valve means has a normal fail-safe position corresponding to and effectuating the standard brake system. In one version, individual electrically-operated valves are provided, one for each brake chamber. In another version a single electrically-operated valve is connected in the service line to the relay emergency valve of the trailer brake system.

---

This invention relates to combination vehicles, such as tractor-trailer vehicles and particularly to the trailer brake systems thereof.

The time required for the air pressure system, lines, valves, etc. to empty and for the air pressure therewithin, as a result of brake operation, to decay is such as to permit the trailer brakes to remain in "brakes-on" position after the tractor brakes have been released. Such a condition is productive of lock-up skid conditions on ice, rain-slick pavements and the like, fifth-wheel strain and shock, unbalanced axle loadings and tendencies toward jack-knifing and loss of directional control. Hence it is one purpose of the invention to provide a means of rapidly releasing the trailer braking pressure and returning the trailer-brake operating chambers to brakes-off position substantially simultaneously with the release of the tractor brake chambers to brakes-off position.

Another purpose is to provide a trailer brake release system including fail-safe provisions insuring retention of standard braking operation under all conditions of the rapid release system.

Other purposes may appear from time to time during the course of the specification and claims.

BRIEF DESCRIPTION OF THE DISCLOSURE

The invention is illustrated more or less diagrammatically in the accompanying drawings wherein:

FIGURE 1 is a schematic representation of the system of the invention;

FIGURE 2 is a variant form of the invention;

FIGURE 3 illustrates a valve usable with the invention; and

FIGURE 4 is a partial illustration of the structure of FIGURE 3 with parts in another position.

Like parts are indicated by like numerals throughout the specification and drawings.

DESCRIPTION OF THE PREFERRED EMBODIMENT

Referring now to the drawings, and particularly to FIGURE 1, the numeral 1 generally designates a tractor-mounted brake application valve which may be of well known construction. An operating pedal 2 is provided for actuation of application valve 1. An electrical signal generator such as the normally closed switch 3 is opened upon movement of the pedal 2 toward brakes-on position and closes upon release of the brake pedal 2.

It will be understood that the application valve 1, pedal 2, switch 3, a conductor 4 and connector 5 are mounted on a tractor. A similar connector 6 is mounted on the trailer and is connected by conductor 7 to a time-delay switch 8. A conductor 9 connects the time delay switch or device 8 to a plurality of electrically operated exhaust or release valves 10.

A trailer-mounted source or tank of fluid pressure is indicated at 11. A conduit 12 connects the tank 11 with a relay emergency valve 13 which is in turn connected with brake chambers 14 by individual conduits 15 in known manner. It will be observed that an electrically operated valve 10 is associated in each of the conduits 15.

As may be observed in FIGURES 3 and 4, while the valves 10 may take a variety of forms, it will be realized that, in each case, the valve 10 has a normal position in which the conduit 15 with which it is associated is maintained open for passage of fluid pressure therethrough in either direction. Upon delivery of electrical energy to the valve 10, however, the valve is moved to a second position which closes the conduits 15 upstream of the chambers 14 and opens the chambers, and the portions of conduits 15 between the chambers and the valves 10, to atmosphere.

It will be understood that the valves 10 may take a variety of forms. In the form illustrated in FIGURES 3 and 4, for example, the valves 10 may include a housing 20 in which a valve member 21 is urged into normal position by a spring 22. A solenoid 23, having external terminal 24, surrounds a stem portion of the valve 21. A passage 25 through the valve housing has its opposite ends communicating with the conduit 15. As illustrated, for example, the right-hand portion of passage 25 may be connected to the upstream portion of conduit 15 and the opposite or left-hand portion of passage 25 may be connected to the downstream portion of conduit 15 which extends to the brake chambers. The valve member 21 has a reduced portion 21a providing for passage of fluid pressure in opposite directions through the housing 10.

As illustrated in FIGURE 4, an elongated recess 26 provides communication with the left-hand portion of passage 25 with an exhaust to atmosphere outlet 27 when solenoid coil 23 is activated. At the same time, with the valve member 21 in the position of FIGURE 4 in response to delivery of electrical energy to solenoid 23, a solid portion 21b of valve 21 closes the right-hand portion of passage 25 to preclude escape of fluid pressure from the upstream portion of the system.

Referring now to FIGURE 2, the relay emergency valve 13 is shown as having the area above the well-known service piston (not shown) within the relay emergency valve connected by conduit 30 with a two-way check valve 31 in known manner. An electrically operated valve 10 is connected in the conduit 30 in the manner in which the valves 10 are connected in conduits 15 as described above. The time delay device 8 is connected by conduit 9 to the single valve 10 in FIGURE 2.

The use and operation of the invention are as follows:

Upon release of the pedal 2, the switch 3 closes to direct electrical energy through conductor 4, connectors 5 and 6 and conductor 7 to the time delay switch or device 8. Thereupon an electrical impulse of predetermined duration is directed through conductor 9 to the valves 10 connected in series therein to move the valves 10 into exhaust position. Since there is a valve 10 for each brake chamber and since the delivery of electrical energy thereto is substantially immediately upon the release of the pedal 2, it will be realized that the brake chambers 14 will be exhausted to atmosphere much sooner than would be the case were it necessary to await the decay or emptying of fluid pressure in all of the lines of the system back to an exhaust valve structure on the tractor and the resultant return of relay valve 13 to an exhaust position.

In the form of the invention illustrated in FIGURE 2, the release of further brake pressure will be slightly less rapid than with the form of FIGURE 1. In the form of FIGURE 2, the service area above the service piston in relay valve 13 is exhausted through conductor 30 and valve 10 to atmosphere to provide a rapid movement of the elements within valve 13 toward exhaust position. The form of FIGURE 2 has the advantage of economy and may be desirable in those situations wherein a slightly less rapid release of trailer brakes is acceptable.

As will be clearly understood from FIGURES 3 and 4, the valves 10 may be considered three-way valves. In normal position the passage 25 is open for flow of fluid pressure in either direction. Hence the standard trailer brake system is maintained at all times when electrical energy is not delivered to the valves 10. Should the system of the invention fail, normal braking operation will still be possible.

The embodiments of the invention in which an exclusive property or privilege is claimed are defined as follows:

1. For use with a tractor-trailer combination vehicle having a tractor brake application pedal and a trailer brake system including brake actuating chambers, exhaust valve means electrically operable between a normal position in communication with said trailer brake system, and an exhaust position, electrical signal generating means electrically connected to said valve means and responsive to release of said pedal to move said valve means to exhaust position to exhaust said actuating chambers, and means to reactivate said valve means to its normal position following exhaust of the chambers for normal braking operation.

2. The structure of claim 1 wherein said valve means includes a valve housing having a passage therethrough and an exhaust outlet and a valve member movable in said housing, said valve member having a first position maintaining said passage open for flow of fluid pressure in either direction therethrough and closing said exhaust outlet, said valve member having a second position communicating one end of said passage with said exhaust outlet and closing the opposite end of said passage.

3. The structure of claim 2 wherein said valve means includes yielding means in said housing and effective against said valve member to urge said valve member toward said first position.

4. The structure of claim 1 wherein said trailer brake system includes a plurality of fluid pressure conduits, each of said conduits communicating with one of said actuating chambers and said valve means includes a plurality of valve members, each of said valve members communicating with one of said conduits adjacent its associated actuating chamber.

5. The structure of claim 1 wherein said trailer brake system includes a relay emergency valve and a service line communicating with said relay emergency valve and said valve means includes a valve member communicating with said service line.

6. The structure of claim 1 wherein said trailer brake system incorporates fluid pressure conduit means and said valve means comprises at least one solenoid operated valve in said conduit means, said valve having a normal position maintaining said conduit means in normal open-status, said valve being movable in response to delivery of electrical energy thereto into said exhaust position closing the upstream portion of said conduit means and exhausting the downstream portion of said conduit means to atmosphere.

7. For use with a tractor-trailer combination vehicle having a tractor brake application pedal and a trailer brake system including brake actuating chambers, electrically operable exhaust valve means in communication with said trailer brake system, electrical signal actuating means electrically connected to said valve means and responsive to release of said pedal to move said valve means to the exhaust position to exhaust said actuating chambers, and an electrical time delay device connected to said signal actuating means and said electrically operable exhaust valve means, said time delay device being effective to hold said valve means in said exhaust position for a predetermined period of time.

References Cited

UNITED STATES PATENTS

| 2,169,668 | 8/1939 | Thomas | 188—3 |
| 2,800,980 | 7/1957 | Flockhart | 303—68 |

MILTON BUCHLER, Primary Examiner

J. J. McLAUGHLIN, Jr., Assistant Examiner

U.S. Cl. X.R.

188—3; 303—3, 15, 69